(12) United States Patent
Bai et al.

(10) Patent No.: US 9,699,428 B2
(45) Date of Patent: Jul. 4, 2017

(54) LENS SHADING MODULATION

(71) Applicant: Apple Inc., Cupertino, CA (US)

(72) Inventors: Yingjun Bai, San Jose, CA (US);
Michael Chin, Belmont, CA (US);
Touraj Tajbakhsh, San Jose, CA (US)

(73) Assignee: Apple Inc., Cupertino, CA (US)

( * ) Notice: Subject to any disclaimer, the term of this patent is extended or adjusted under 35 U.S.C. 154(b) by 101 days.

(21) Appl. No.: 14/269,941

(22) Filed: May 5, 2014

(65) Prior Publication Data
US 2015/0070537 A1 Mar. 12, 2015

Related U.S. Application Data

(60) Provisional application No. 61/875,657, filed on Sep. 9, 2013.

(51) Int. Cl.
| | |
|---|---|
| *H04N 5/208* | (2006.01) |
| *H04N 9/73* | (2006.01) |
| *H04N 1/60* | (2006.01) |
| *H04N 5/235* | (2006.01) |
| *H04N 5/357* | (2011.01) |
| *H04N 9/64* | (2006.01) |

(52) U.S. Cl.
CPC ............... *H04N 9/735* (2013.01); *H04N 1/60* (2013.01); *H04N 1/6086* (2013.01); *H04N 5/2353* (2013.01); *H04N 5/3572* (2013.01)

(58) Field of Classification Search
CPC ........ H04N 5/357; H04N 5/3572; H04N 9/71; H04N 1/6086; H04N 9/73; H04N 9/735; H04N 5/235; H04N 5/2353; H04N 1/58; H04N 1/60

USPC .............................................. 348/241, 223.1
See application file for complete search history.

(56) References Cited

U.S. PATENT DOCUMENTS

| | | | | |
|---|---|---|---|---|
| 7,893,975 | B2 | 2/2011 | Zimmer | |
| 8,120,570 | B2 | 2/2012 | Kerofsky | |
| 8,130,292 | B2 * | 3/2012 | Lee | H04N 5/2354 348/251 |
| 8,194,159 | B2 * | 6/2012 | Wang | H01L 27/14625 348/251 |
| 8,207,932 | B2 | 6/2012 | Kerofsky | |
| 8,406,557 | B2 * | 3/2013 | Park | H04N 5/3572 348/241 |

(Continued)

*Primary Examiner* — Ngoc-Yen Vu
(74) *Attorney, Agent, or Firm* — Blank Rome LLP

(57) ABSTRACT

This disclosure pertains to systems, methods, and computer readable media for performing lens shading correction (LSC) operations that modulate gains based on scene lux level and lens focus distance. These gains compensate for both color lens shading (i.e., the deviation between R, G, and B channels) and vignetting (i.e., the drop off in pixel intensity around the edges of an image). As scene illuminance increases, the sensor captures more signal from the actual scene, and the lens shading effects begin to appear. To deal with the situation, the lens shading gains are configured to adaptively 'scale down' when scene lux approaches zero and 'scale up' when scene lux changes from near zero to become larger. The lens shading gain may also be modulated based on the focus distance. For optical systems without zoom, the inventors have discovered that the amount of lens shading fall off changes as focus distance changes.

20 Claims, 12 Drawing Sheets
(2 of 12 Drawing Sheet(s) Filed in Color)

(56) References Cited

U.S. PATENT DOCUMENTS

| | | | | |
|---|---|---|---|---|
| 8,537,240 B2* | 9/2013 | Dalton | ................... | H04N 9/646 |
| | | | | 348/223.1 |
| 8,593,548 B2* | 11/2013 | Sun | ..................... | H04N 5/3572 |
| | | | | 348/251 |
| 8,953,056 B2* | 2/2015 | Ovsiannikov | ............ | G03B 7/08 |
| | | | | 348/221.1 |
| 8,976,240 B2* | 3/2015 | Matherson | ........... | H04N 17/002 |
| | | | | 348/132 |
| 9,083,900 B2* | 7/2015 | Chen | ................... | H04N 5/3572 |
| 9,256,959 B1* | 2/2016 | Li | ........................... | G06T 7/408 |
| 9,367,916 B1* | 6/2016 | Paliy | ................... | H04N 17/002 |
| 9,432,647 B2* | 8/2016 | Tajbakhsh | .............. | H04N 9/735 |
| 2006/0056082 A1* | 3/2006 | Hung | .................... | H04N 5/217 |
| | | | | 359/819 |
| 2008/0252791 A1 | 10/2008 | Mitsunaga | | |
| 2009/0147106 A1* | 6/2009 | Sakamoto | .............. | H04N 5/217 |
| | | | | 348/234 |
| 2011/0292246 A1 | 12/2011 | Brunner | | |
| 2014/0002694 A1 | 1/2014 | Levy | | |
| 2014/0184813 A1* | 7/2014 | Cohen | .................. | H04N 5/3572 |
| | | | | 348/187 |
| 2014/0218540 A1* | 8/2014 | Geiss | .................. | H04N 17/002 |
| | | | | 348/181 |
| 2014/0307129 A1 | 10/2014 | Feng | | |

\* cited by examiner

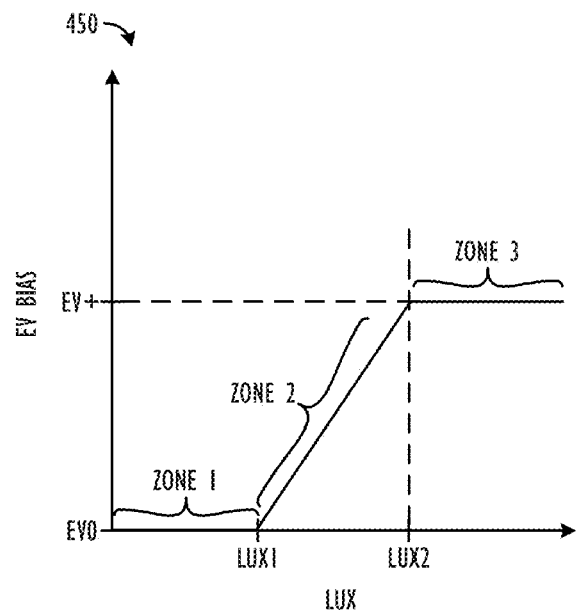
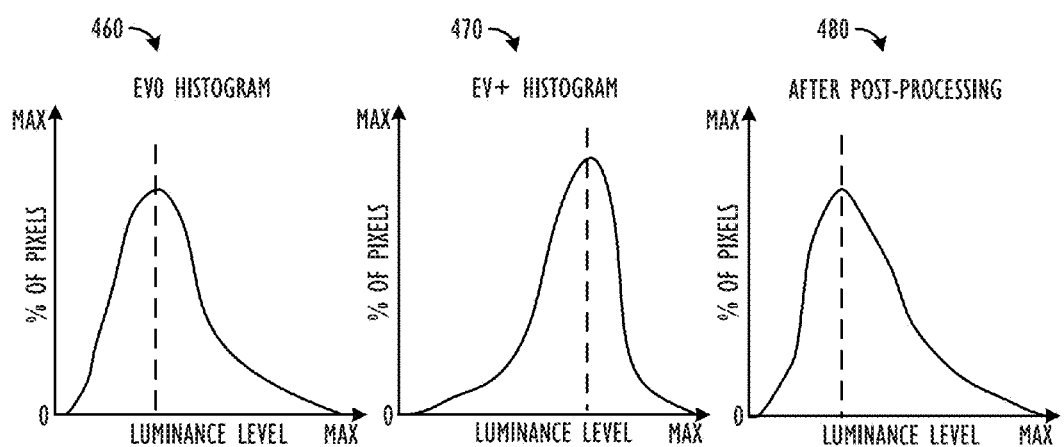
FIG. 4B

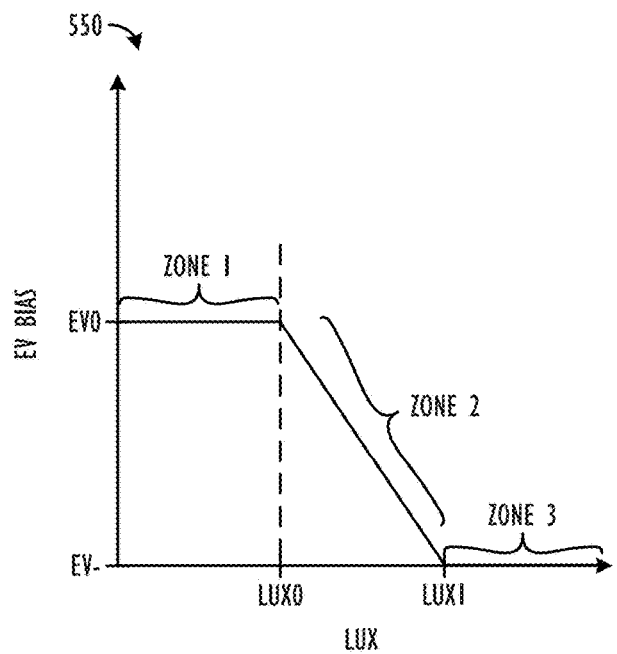
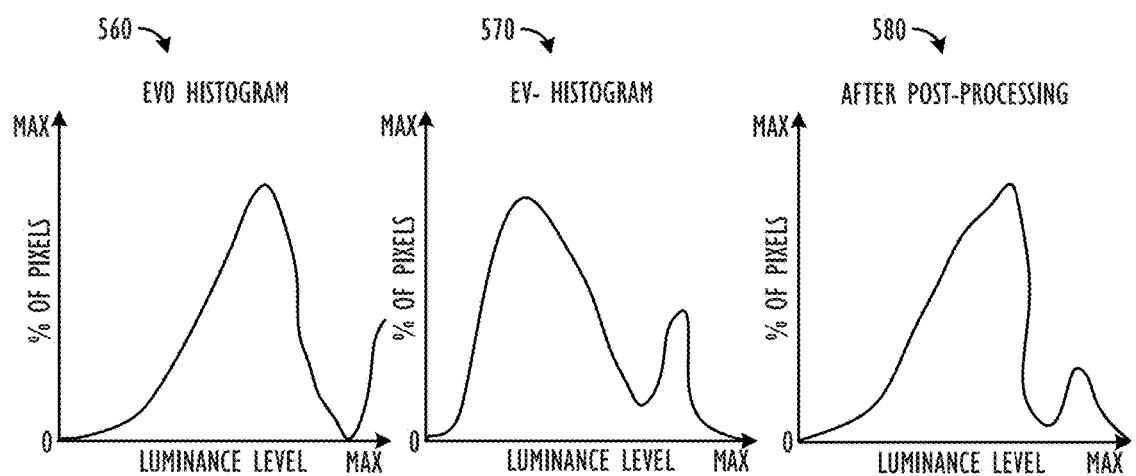
FIG. 5B

LENS SHADING MODULATION

CROSS-REFERENCE TO RELATED APPLICATION

This application claims priority to U.S. Provisional Patent Application No. 61/875,657, entitled, "Adaptive Auto Exposure and Dynamic Range Compression with Noise Balancing using Lens Shading Modulation" and filed Sep. 9, 2013 ("the '657 application"). The '657 application is also hereby incorporated by reference in its entirety.

BACKGROUND

This disclosure relates generally to the field of image processing and, more particularly, to various techniques for use in adaptively auto exposing and improving the signal-to-noise ratio of digital images captured by an image sensor, e.g., in a personal electronic device.

Today, many personal electronic devices come equipped with digital cameras. Often, these devices perform many functions, and, as a consequence, the digital image sensors included in these devices must often be smaller than the sensors in conventional cameras. Further, the camera hardware in these devices often have smaller dynamic ranges and lack sophisticated features sometimes found in larger, professional-style conventional cameras such as manual exposure controls and manual focus. Thus, it is important that digital cameras in personal electronic devices be able to produce visually appealing images in a wide variety of lighting and scene situations with limited or no interaction from the user, as well as in a computationally and cost-effective manner.

One feature that has been implemented in some digital cameras to compensate for lack of dynamic range and create visually appealing images is known as "auto exposure." Auto exposure (AE) can be defined generally as any algorithm that automatically calculates and/or manipulates certain camera exposure parameters, e.g., exposure time, ISO, or f-number, in such a way that the currently exposed scene is captured in a desirable manner.

Auto exposure algorithms are often employed in conjunction with image sensors having small dynamic ranges because the dynamic range of light in a given scene, i.e., from absolute darkness to bright sunlight, is much larger than the range of light that some image sensors—such as those often found in personal electronic devices—are capable of capturing. However, the exposure parameter adjustments, e.g., gain adjustments, implemented by traditional AE algorithms may cause the signal to be "clipped," that is, be pushed to a value above (or below) what the camera's hardware is capable of storing. This clipping process can result in the loss of valuable image detail.

In addition to the above-mentioned clipping issue, image noise is another challenge the image processing pipeline needs to deal with. The use of longer sensor integration time is one technique that may be employed to attempt to enhance the image signal while reducing the random noise. Often, however, image processing pipelines do not fully utilize this image sensor behavior when the scene to be captured allows for longer integration time before signal clipping occurs.

The inventors have realized new and non-obvious ways to achieve lower noise image captures and process the resulting captured images without clipping the image signal. The inventors have also realized new and non-obvious ways to perform lens shading correction (LSC) operations that modulate gains based on scene lux level and lens focus distance.

SUMMARY

Imaging sensors have limited capability to hold electrons generated from integrating incoming light energy over exposure time. When more electrons are produced through exposure to light than what an imaging sensor pixel can hold, image signal clipping will occur. Before clipping occurs, longer integration times may be employed to produce a less noisy and higher quality image. The ratio of the highest non-clipped pixel value to the lowest non-clipped pixel value may be used to define the "dynamic range" of the captured image. The role of traditional AE is to find a balanced exposure time, whereby the scene is well exposed—without causing significant signal clipping—in order to achieve a good compromise between noise and dynamic range. The limiting factor of this strategy in brightly-lit scene conditions is signal clipping. The limiting factor of this strategy under dimly-lit scene conditions is image noise.

Raw imaging sensor data needs to be processed by image processing hardware and software to be useable for viewing. Often, the digital processing is employed to improve the image quality of the raw sensor data, such as filtering out the noise, correcting the color, and even enhancing the image to achieve pleasing rendering quality. Over the past years, the research community has come up with more and more powerful noise filtering techniques to effectively remove the sensor noise. More advanced sensor data noise filtering allows a noisier sensor input to result in visually pleasing images in a greater amount of captured images. This opens the opportunity to use shorter exposure times, while still producing a quality final output image. One benefit of shorter exposure time is to allow more high luminance (i.e., bright) scene content to be properly exposed without causing signal clipping. This provides the possibility to produce higher dynamic range image content using the same image sensor but a different exposure strategy and image processing algorithms.

As noise filtering algorithms advance, they provide some leverage to allow the AE exposure strategies to be more flexible. However, noise filtering is often not powerful enough to make higher quality resulting images, as compared to simply using a longer exposure time to accumulate more electrons to physically have a better (i.e., quieter) image sensor input to start. In addition, digital noise filtering often has the undesirable side effect of suppressing image detail and low contrast textures, thereby preventing a faithful rendering of the scene's content. This is another difficulty that AE systems attempt to deal with. One commonly-used AE target value in the industry is about 20% of the full capacity of the sensor. This corresponds to the 18% neutral surface exposure target in the film photography era. With a simplified image sensor noise behavior formula, the signal-to-noise ratio of the sensor pixel value may be set to the square root of the signal itself. With this formula, the more electrons the sensor pixel collects, the higher the signal-to-noise ratio of the image signal will become. So, to account for increased signal noise, one approach is to increase the integration time as much as possible before signal clipping occurs. When the signal is weak, increasing integration time is often a natural choice to enhance image quality. It is the bright—yet, relatively low contrast—scenes that provide the opportunity to have a better signal-to-noise ratio with a more flexible AE strategy. Thus, in one embodiment described herein, the 20% full capacity target value integration strategy can be altered to boost the signal—with less noise and no clipping.

In summary, the disclosure relates to scene-adaptive AE strategies and digital signal processing techniques that may be employed to achieve a desired image capture and rendering experience according to the image sensor's characteristics and rendering purpose. In the following description of the disclosure, "EV0" refers to the standard exposure strategy. "EV+" refers to an exposure target that is larger than the EV0 target. "EV−" refers to an exposure target that is smaller than the EV0 target. The EV0 exposure strategy may be different from manufacturer to manufacturer of image sensors.

This disclosure also relates to strategies and techniques for performing lens shading correction operations that modulate gains based on scene lux level and lens focus distance. These gains compensate for both color lens shading (i.e., the deviation between R, G, and B channels) and vignetting (i.e., the drop off in pixel intensity around the edges of an image). As scene illuminance increases, the sensor captures more signal from the actual scene, and the lens shading effects begin to appear. To deal with the situation, the lens shading gains are configured to adaptively 'scale down' when scene lux approaches zero and 'scale up' when scene lux changes from near zero to become larger. The lens shading gain may also be modulated based on the focus distance. For optical systems without zoom, the inventors have discovered that the amount of lens shading fall off changes as focus distance changes.

Thus, in one embodiment disclosed herein, a non-transitory program storage device, readable by a programmable control device, may comprise instructions stored thereon to cause the programmable control device to: obtain a first AE target for a first image of a scene to be captured by an image sensor; obtain the first image captured based, at least in part, on the first AE target, wherein the first image comprises a first plurality of pixels; determine whether there is unused dynamic range in the captured first image; determine a second AE target different from the first AE target if it is determined that there is unused dynamic range; obtain a second image captured based, at least in part, on the second AE target, wherein the second image comprises a second plurality of pixels; generate one or more Dynamic Range Compensation (DRC) curves for the second image based, at least in part, on the first AE target; and perform tone mapping on the second plurality of pixels using the generated one or more DRC curves, wherein the tone mapping performed on the second plurality of pixels is configured to render the second image to match a rendering as if the second image was captured with the first AE target. A global DRC curve (or a plurality of spatially-varying local DRC curves) may be used to digitally gain down the low and middle tone signal of EV+ image to maintain the luminance of EV0. The DRC curve(s) may also be used to expand the contrast on the highlights of the EV+ image while ensuring that white pixels (i.e., those pixels having the maximum possible luminance value) remain white to avoid "under-clamping." The term "under-clamping" refers to the process of pulling down the white over-exposed image pixels to a gray tone. This may lead to an undesired appearance of image highlights. In analogy to the human visual system, very bright scene highlights are expected to be perceived as pure white, but not gray, and thus the image processing pipeline, according to some embodiments, may desirably pertain white over-exposed pixels, rather than graying them out.

In another embodiment disclosed herein, a non-transitory program storage device, readable by a programmable control device, may comprise instructions stored thereon to cause the programmable control device to: obtain a first AE target for a first image of a scene to be captured by an image sensor; obtain the first image captured based, at least in part, on the first AE target, wherein the first image comprises a first plurality of pixels; determine whether any of the first plurality of pixels comprise clipped highlight pixels; determine a second AE target different from the first AE target if it is determined that clipped highlight pixels are present; obtain a second image captured based, at least in part, on the second AE target, wherein the second image comprises a second plurality of pixels; generate one or more DRC curves for the second image based, at least in part, on the first AE target; and perform tone mapping on the second plurality of pixels using the generated one or more DRC curves, wherein the tone mapping performed on the second plurality of pixels is configured to render the second image to match a rendering luminance as if the second image was captured with the first AE target. A global DRC curve (or a plurality of spatially-varying local DRC curves) may be used to digitally gain up the lowlight and mid-tone regions of the image signal to maintain the luminance of EV0. The DRC curve(s) may also be used to compress the highlight regions of the EV− image so that rendering does not cause signal clipping from the linear gain up operation.

In another embodiment disclosed herein, a non-transitory program storage device, readable by a programmable control device, may comprise instructions stored thereon to cause the programmable control device to: obtain a first image of a scene, wherein the first image comprises a first plurality of pixels; determine a scene illuminance level for the first image; determine a lens shading correction level based, at least in part, on the determined scene illuminance level; and modulate the determined lens shading correction level based, at least in part, on the determined scene illuminance level, wherein the determined lens shading correction level encompasses both color shading gain and vignetting gain.

In another embodiment disclosed herein, a non-transitory program storage device, readable by a programmable control device, may comprise instructions stored thereon to cause the programmable control device to: obtain a first image of a scene, wherein the first image comprises a first plurality of pixels; obtain a focal distance of a lens used to capture the first image; determine a lens shading correction level based, at least in part, on the obtained focal distance; and modulate the determined lens shading correction level based, at least in part, on the obtained focal distance, wherein the determined lens shading correction level encompasses both color shading gain and vignetting gain.

In still other embodiments, the techniques described herein may be implemented in apparatuses and/or systems, such as electronic devices having image capture capabilities, memory, and programmable control devices.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 4B illustrates an EV+ adaptive AE scenario in line graph and histogram forms.

FIG. 5B illustrates an EV− adaptive AE scenario in line graph and histogram forms.

DETAILED DESCRIPTION

Figure 1:
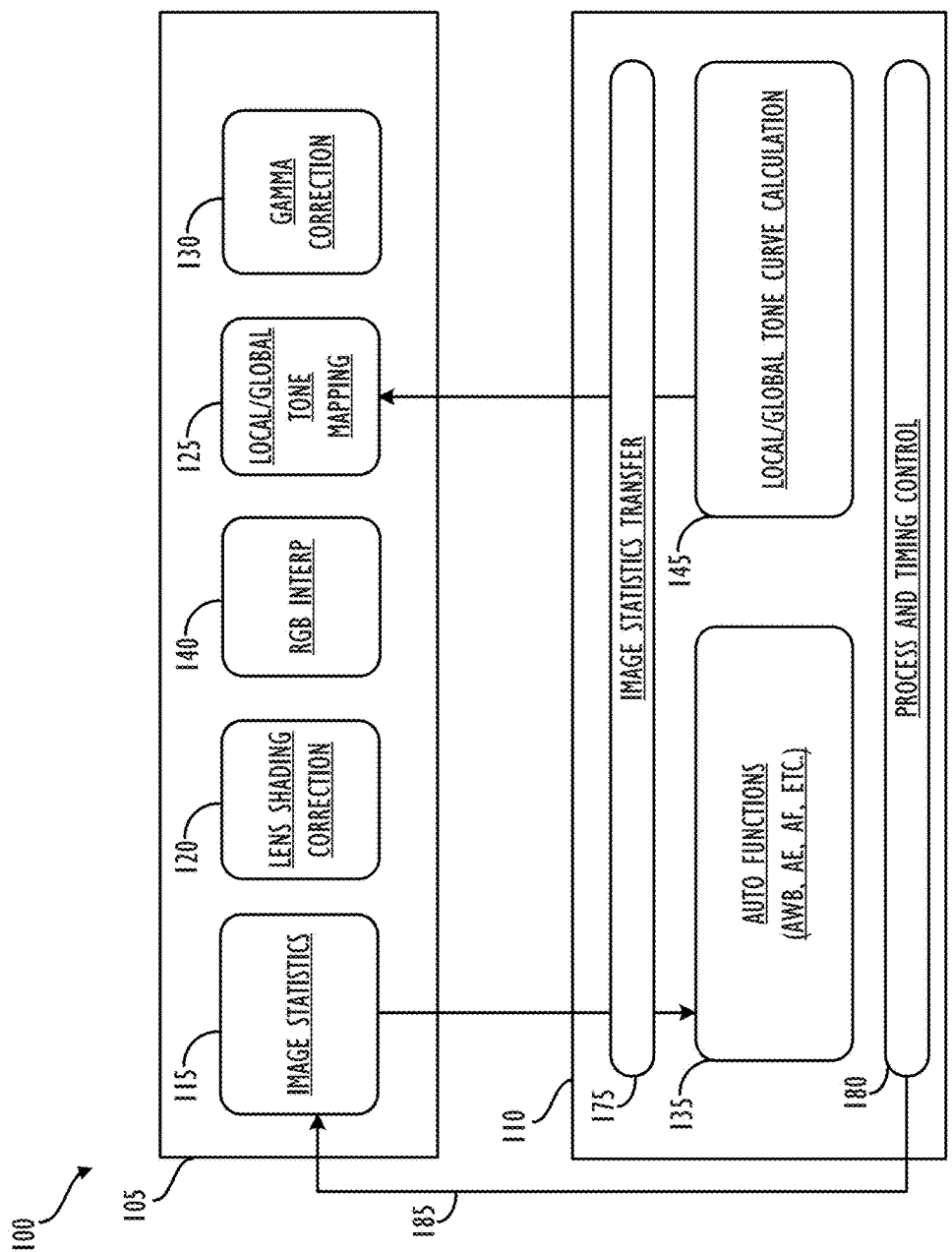
FIG. 1 shows an adaptive AE and tone mapping overview in block diagram form, according to one embodiment.

This disclosure pertains to systems, methods, and computer readable media for extending the dynamic range of images using an operation referred to herein as "Adaptive Auto Exposure" (AAE). According to the embodiments disclosed herein, the AAE-enabled higher dynamic range capture operations are accomplished without taking multiple or bracketed exposure captures (as is the case with traditional high dynamic range (HDR) photography). AAE also enables high signal-to-noise ratio (SNR) rendering when the scene content has relatively low dynamic range and/or certain highlight clipping is tolerable. Decisions with regard to preferred AE strategies may be based, at least in part, on one or more of the following: sensor characteristics; scene content; and pre-defined preferences under different scenarios.

In the generation of high dynamic range images prior to the use of the dynamic range extension techniques described herein, the user of the camera had to either take multiple images bracketed at different exposure levels and attempt to fuse the images together—which often resulted in blurriness, ghosting, or other unwanted artifacts associated with movement of the camera and/or objects within the image between successive exposures. With the use of the AAE techniques described herein, however, the user of the imaging system may simultaneously capture an extended dynamic range image, as well as avoid the need to fuse together multiple images taken at different bracketed exposure levels. The "EV−" exposure setting described above (wherein an exposure target is set that is smaller than the "EV0" target) allows more scene content be properly captured by the sensor. The "up processing" that follows the use of an "EV−" exposure setting subsequently tone maps the higher dynamic range content of the image to a regular dynamic range image—with the rendering result appearing close to an "EV0" rendering result but with additional highlight benefits which would become clipped in the "EV0" image otherwise. For the "EV−" case, the amount of "up processing" that may be done to bring in more highlights to the processed image is limited by sensor noise. The "EV+" exposure setting described above (wherein an exposure target is set that is higher than the "EV0" target) improves the signal-to-noise ratio of the captured image compared to what is acquired by the "EV0" exposure setting. The "down processing" that follows the use of an "EV+" exposure setting subsequently maps the lower dynamic range image digitally to match the appearance of "EV0" rendering. For the "EV+" case, the amount of "down processing" that may be done is limited mainly by the amount of motion blur in the captured image. For example, the upper bound of the EV+ may be determined based, at least in part, on the system's capability to control motion blur. The amount of motion blur may be determined in real-time or near real-time and used as a limiter on the amount of "down processing" that is performed on the image.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one implementation of the invention, and multiple references to "one embodiment" or "an embodiment" should not be understood as necessarily all referring to the same embodiment.

It will be appreciated that, in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design of an implementation of image processing systems having the benefit of this disclosure.

Referring now to FIG. 1, an overview diagram 100 is shown. The overview diagram is composed of two primary parts, hardware block 105 and firmware block 110. Hardware block 105 may, for example, comprise a programmable microprocessor such as the ARM® Cortex A7, Apple A6 system on a chip (SoC), or other suitable processor, as well as an image sensor package, such as a CMOS sensor. Firmware block 110 may comprise a control system, e.g., process and timing control block 180, which may also be used to set up and program the hardware block 105 on a frame-by-frame basis via pathway 185, e.g., based on various image statistics related to the image processing pathway gathered by the hardware block 105. Hardware block 105 may comprise multiple functional blocks, including an Image Statistics block 115, a lens shading correction block 120, an RGB interpolation block 140, a local/global tone mapping block 125, and gamma correction block 130.

Likewise, firmware block 110 may comprise multiple functional blocks, including an Auto function block 135 (which may include camera functions such as Auto White Balance (AWB), Auto Exposure (AE), and Auto Focus (AF)) and a local/global tone curve calculation block 145 to compress the higher dynamic content to a normal range, each of which will be explained in further detail below. In the case of local, i.e., spatially-varying tone curve calculation, DRC curves may be determined at, e.g., individual pixel locations or at a plurality of locations throughout the image. Various image statistics are shared between different functional blocks of firmware block 110 and hardware block 105, e.g., via image statistics transfer interface 175. For example, thumbnails and histograms may be sent from Image Statistics block 115 to Auto function block 135.

Hue-Preserving RGB Tone Mapping Operation

Figure 2:
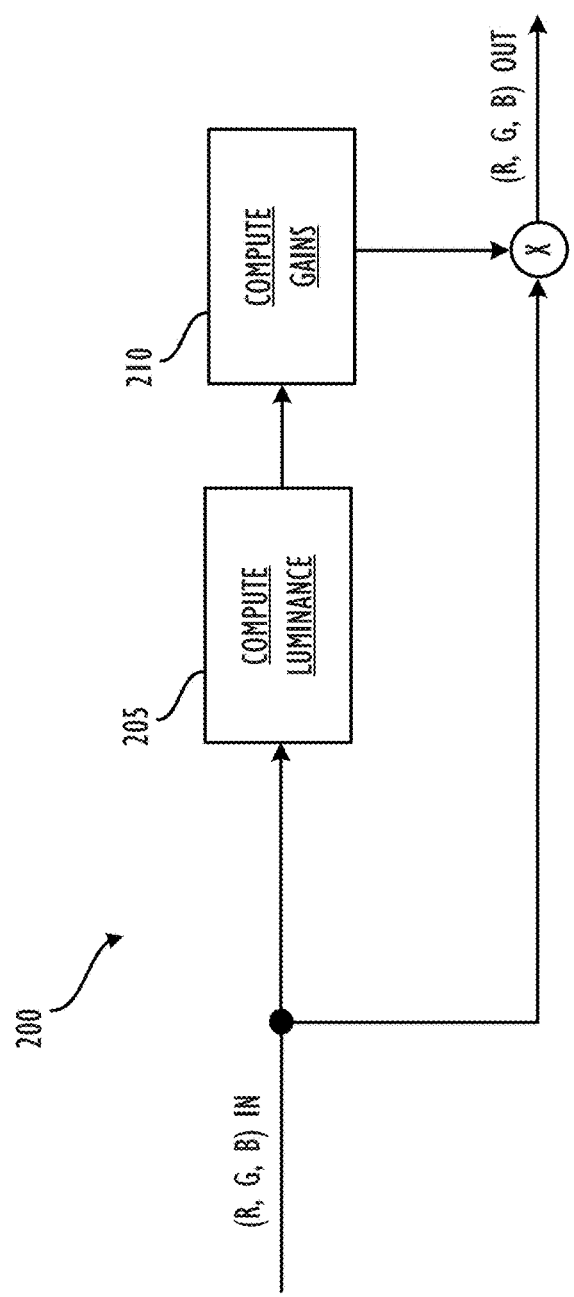
FIG. 2 shows a hue-preserving RGB tone mapping process in block diagram form, according to one embodiment.

The hue-preserving RGB tone mapping operation, as described herein, may comprise a global or local tone modification process. A block diagram 200 illustrating the tone mapping process, according to one embodiment, is shown in FIG. 2. First, luminance values are calculated from the RGBs going into the tone mapping block 205. For instance, the luminance value may be a linear combination of R, G, and B, or the maximum of R, G, and B, or a mixture of both aforementioned definitions. Next, gains are computed 210 from a global/local tone mapping curve, and the gains are applied to the input RGB values to generate the desired output RGB levels. The tone mapping operation 200 may scale the RGB values by a gain, $g=Y_{out}/Y_{in}$, where $Y_{in}$ and $Y_{out}$ are luminance representations of the input and output to block 210, respectively. In contrast to global tone mapping as is commonly applied in the gamma correction portion of the image processing pipeline, for instance, hue-preserving RGB tone modification does not shift the hues of RGBs since the input to output mapping is not applied to RGB channels separately, but to a common luminance channel. Thus, all RGB values are scaled with the same local gain, g.

Dynamic Range Compensation (DRC) Curves

Dynamic Range Compensation (DRC) curves, as described herein, provide a simple, yet effective, novel approach for tone compensation, e.g., the compression and/or expansion of high dynamic range content into the normal dynamic range for encoding and viewing. The DRC curves may be constructed such that they begin with a first segment having a linear slope followed by a non-linear (typically compressing) second segment. The linear segment may be used to gain up the mid and darker tones' linearly, in order to match the EV0 exposure image's luminance. The second (i.e., non-linear) segment may be used to compress highlight tones, e.g., due to the additional dynamic range resulting from EV− exposure. The partition of the linear segment and nonlinear segment depends on the EV− value and image content statistics.

DRC Curve Construction

For the DRC curve construction, a piece-wise linear function with N+1 equidistant samples per curve may be used. In some embodiments, N may be chosen to be 32. Let $f_{DRC}(n)$ describe the N+1 samples of the piece-wise linear curve where n is the sample number. A reasonable constraint is imposed, which is to preserve black and white after the mapping, i.e., $f_{DRC}(0)=0$ and $f_{DRC}(N)=1$.

The following exemplary formula uses negative EV bias, EV−, that requires an "up gaining" of the image signal to restore the EV0 image appearance. This gain is denoted as $g_{EV}$ in the description herein.

Based on the EV gain, $g_{EV}$, a knee value $n_{knee} \in \mathbb{R}$, $0<n_{knee}<N$ is obtained that separates a linear segment from a non-linear segment in the function, $f_{DRC}(n)$:

$$n_{knee} = n_{lin}\left(y_{max} - \frac{y_{max} - y_{min}}{N}(N + 1 - n_{lin})\right), \quad \text{(Eqn. 2)}$$

where $n_{lin}=N/g_{EV}$, and the minimum and maximum knee value is specified by $y_{min}$ and $y_{max}$ (e.g., $y_{min}=0.7$ and $y_{max}=0.8$). These values can be used for tuning to achieve a fair trade-off between highlight compression and linearity in the low- and mid-tones.

The linear segment of the function $f_{DRC}(n)$ may be defined as $$f_{lin}(n) \frac{n}{N} g_{EV},$$

and the final DRC curve may be defined recursively as:

$$f_{nonlin}(n) = s(f_{DRC}(n-1) + p[1 - f_{DRC}(n-1)]) \quad \text{(Eqn. 3)}$$

$$f_{DRC}(n) = \begin{cases} f_{lin}(n) & \text{if } n \leq \lfloor n_{knee} \rfloor \\ w f_{lin}(n) + (1-w) f_{nonlin}(n) & \text{if } n = \lfloor n_{knee} \rfloor + 1 \\ f_{nonlin}(n) & \text{otherwise} \end{cases} \quad \text{(Eqn. 4)}$$

where the weight, w, smoothly blends the linear segment into the non-linear segment and is assigned to the fractional part of $n_{knee}$, i.e., $w=\text{mod}(n_{knee},1)$. The parameter, p, defines the shape of the compression part of the curve, that is, the degree of non-linearity (banding). It can be parameterized with $g_{EV}$ to have a different compression at different gain slopes. The parameter, s, is determined for a set of gain values, $g_{EV}$, to fulfill the $f_{DRC}(N)=1$ constraint. These values may be obtained using off-line optimization and may be pre-calculated and stored in a lookup table (LUT). Note that the final DRC curves, $f_{DRC}(n)$, can also be stored in a LUT for a range of gain values, $g_{EV}$, to achieve a better computational efficiency.

Figure 3:
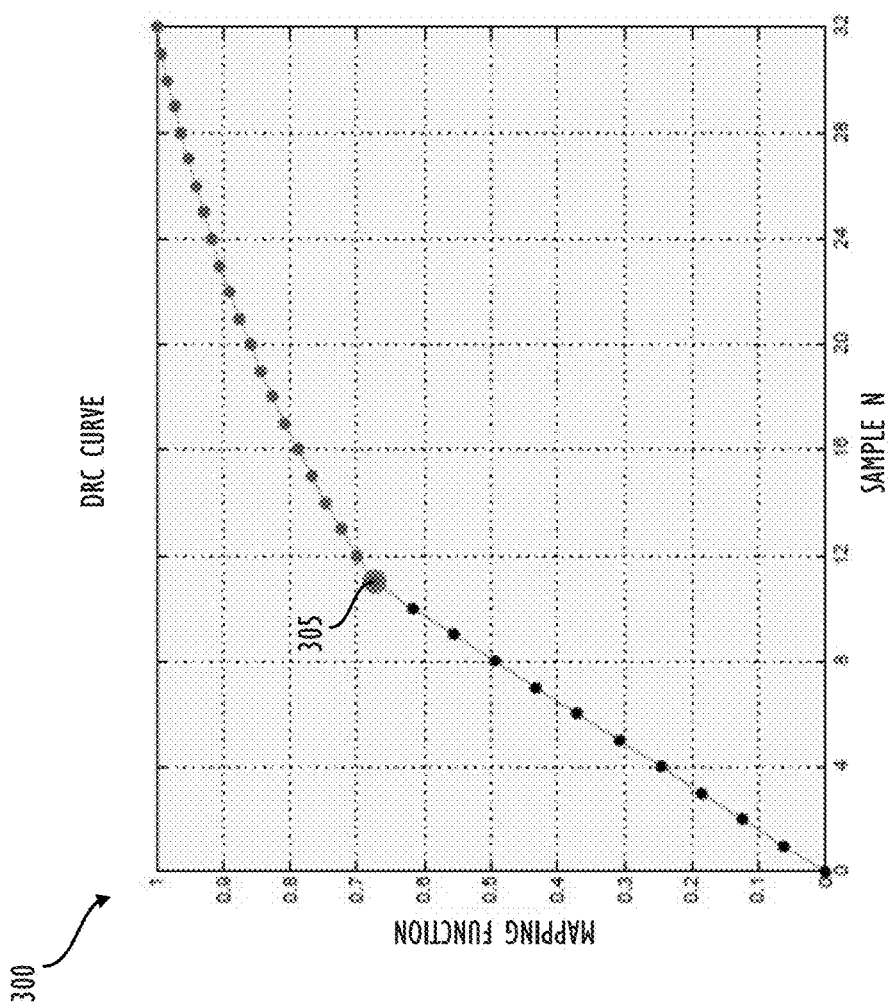
FIG. 3 illustrates a typical DRC curve in graph form, according to one embodiment.

FIG. 3 illustrates an exemplary graph 300 of a DRC curve, $f_{DRC}(n)$, with an EV gain of $g_{EV}=1.977$. The samples to the left of knee point 305 represent the linear portion incorporating the EV gain, $g_{EV}$. The samples to the right of knee point 305 represent the non-linear segment of the curve, which aims to compress the dynamic range. The dot 305 represents a weighted average of the linear and non-linear portions of the curve near the knee point.

AE Adaptation Strategy

When the input image statistics indicate that the scene does not have enough range to fill up the sensor capacity, Adaptive AE (AAE) may increase the exposure target to consciously overexpose the image in order to achieve a higher signal-to-noise level. An example of the above-mentioned image statistics is an image histogram that provides the image pixel luminance distribution for the image.

In contrast to the DRC tone mapping described above, which may be employed in an underexposure situation, the dynamic range expansion process may be performed during tone mapping in an overexposure situation. The basic task may be described as mapping the elevated pixel values down to the value that an "EV0" exposure would produce. To maintain white as white, the highlight portion of the tone expansion curve will have gains larger than 1, which produces a highlight contrast stretch effect. The HW/SW implementation of the dynamic range expansion process mirrors the DRC operation.

Positive-biased AE adaptation ("EV+") depends first on the scene content. In one embodiment described herein, an image histogram may be used to decide if there is 'unused' sensor dynamic range available for the particular scene to be captured in. If so, then the EV+ value can be calculated to achieve a predefined target dynamic filling rule. One exemplary rule comprises filling up the sensor dynamic range with the lower 99 percent of the total pixels based on pixel luminance. In other words, such an exemplary rule would allow 1% of the image content to be clipped. As the scene lux (i.e., illuminance level) gets lower, longer imaging sensor integration time is required to properly capture images. Longer integration times may result in blurry images, e.g., due to motion of object within the scene, while the sensor is capturing light. This AE adaptation process may thus be stopped when the amount of motion-introduced blur is no longer acceptable.

Figure 4A:
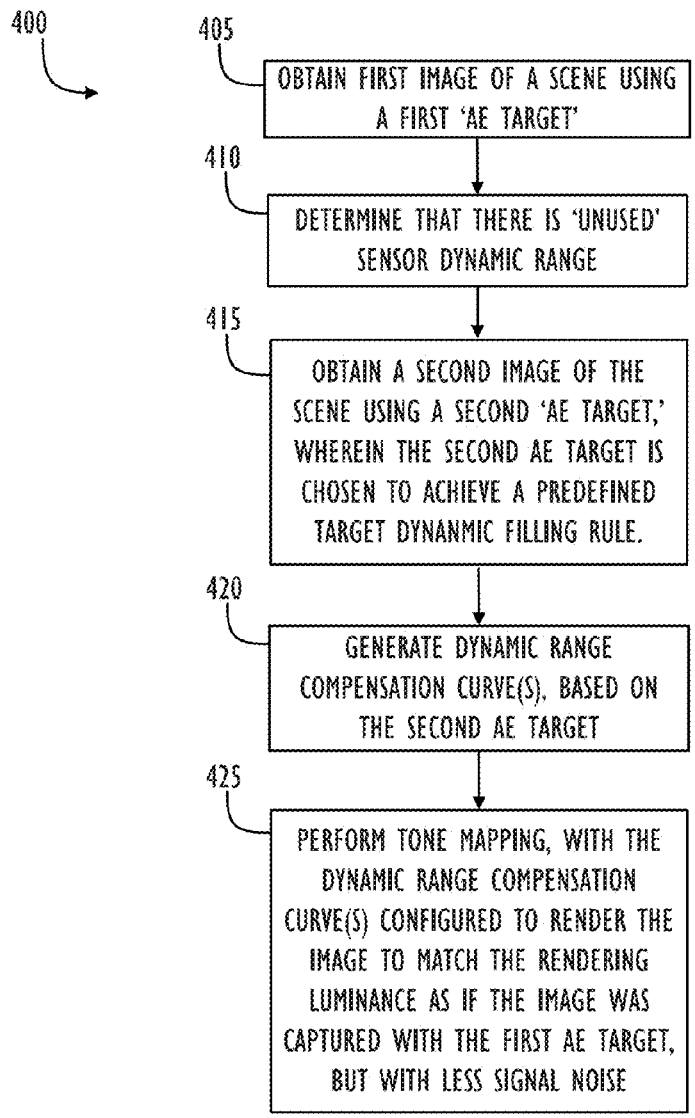
FIG. 4A shows an EV+ adaptive AE and tone mapping overview in flowchart form, according to one embodiment.

Referring now to FIG. 4A, an adaptive AE and tone mapping overview for an EV+ scenario is shown in flowchart form 400, according to one embodiment. First, a first image of a scene is obtained using a first AE Target (405). Then, the process determines that there is 'unused' sensor dynamic range in the first image, i.e., that there are no pixels falling into the highest, say, n buckets of the image luminance histogram (410). Next, the process may obtain a second image of the scene using a second AE Target, configured to utilize at least part of the 'unused' sensor dynamic range (415). Next, the process may generate a DRC curve or multiple curves (e.g., in the case of spatially-varying tone mapping) based, at least in part, on the second AE Target (420). Finally, tone mapping may be performed, with the DRC curve(s) being configured to render the image to match the rendering luminance as if the image was captured with the first AE Target, but with less signal noise than if the image had been captured at the first AE Target (425).

Referring now to FIG. 4B, an EV+ adaptive AE scenario is illustrated in both line graph and histogram forms. Line graph 450 represents three distinct lux zones over which the EV bias may vary in an EV+ scenario. First, in Zone 1, it is recognized that using a longer integration time would make the image more prone to blurring, and thus the EV+ bias will be disabled. Next, in Zone 2, the so-called "transition zone," motion blur gets better as scene illuminance increases, so the EV+ bias may be gradually increased. Finally, in Zone 3, EV+ bias goes to full strength.

Turning to EV0 histogram 460, an exemplary pixel luminance distribution is shown, with the dashed line representing the peak of the histogram, i.e., the luminance level at which the most pixels are located. Next, the EV+ histogram 470 is shown, representing the luminance distribution of pixels in the image that has been captured after the AE target has been biased upward. As such, the peak of the histogram has moved along the horizontal axis closer to the "MAX" luminance level. Finally, post-process histogram 480 represents the distribution of pixel luminance values after the pixels have been rendered as if the image was captured at the EV0 exposure level. As shown in histogram 480, image histogram looks largely similar to the EV0 histogram depicted in histogram 460, but with better noise reduction due to the increased sensor integration time used to capture the EV+ biased image.

Negative-biased AE adaptation ("EV−" or "Dynamic Range extension") may comprise a more constrained adaptation process, as it will result in increased image noise, as compared to the positive-biased AE adaptation. The sensor noise depends on optical system parameters and sensor characteristics. For example, larger lenses and larger pixel areas result in better noise performance due to the physical efficiency of the absorption of light energy. More powerful noise filtering software and hardware may provide an extra buffer to leverage for AE adaptation. EV− adaptation may be applied to captures with sufficient scene lux. The range of the adaptation, in other words, how much AE negative bias can be achieved is noise-bounded, and thus varies from imaging system to imaging system and on a given implementation's noise tolerance criteria. The desired dynamic range and noise balance for a particular scene can thus depend, at least in part, on one or more of: scene lux; sensor noise characteristics; and a noise filter's ability to mask the elevated noise.

Figure 5A:
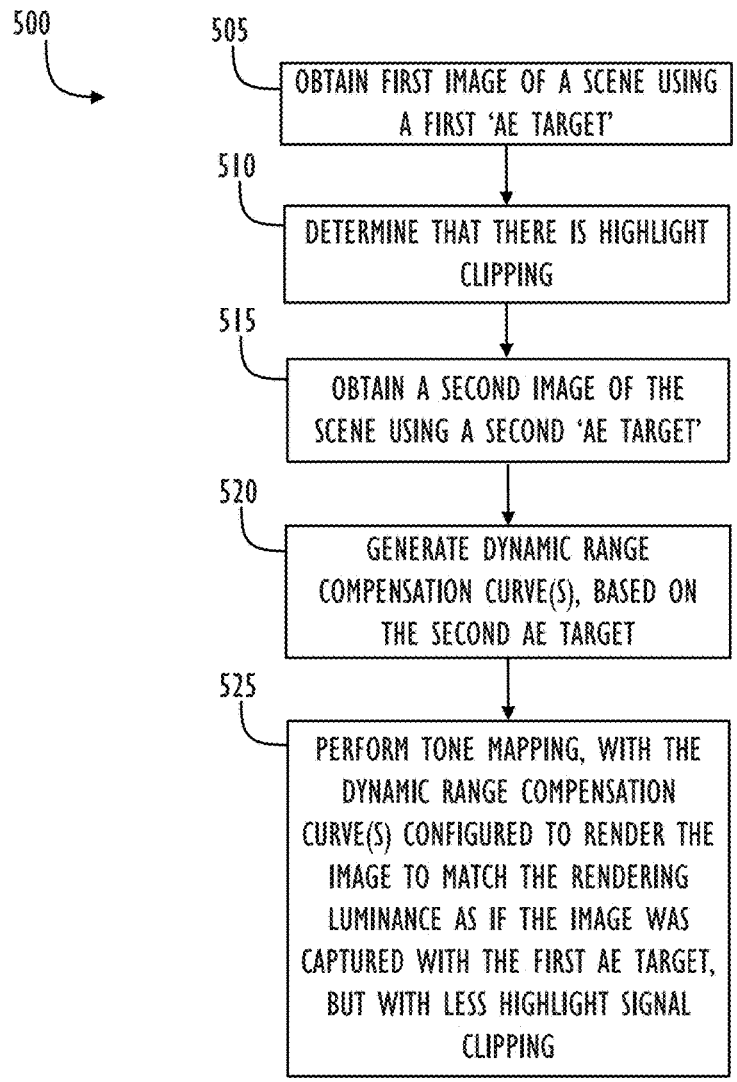
FIG. 5A shows an EV− adaptive AE and tone mapping overview in flowchart form, according to another embodiment.

Referring now to FIG. 5A, an adaptive AE and tone mapping overview for an EV− scenario is shown in flowchart form 500, according to one embodiment. First, a first image of a scene is obtained using a first AE Target (505). Then, the process determines that there is highlight clipping in the first image (510). Next, the process may obtain a second image of the scene using a second AE Target, wherein the second AE Target is chosen to achieve a predefined target dynamic filling rule (515). Next, the process may generate a DRC curve or multiple curves (e.g., in the case of spatially-varying tone mapping) based, at least in part, on the second AE Target (520). Finally, tone mapping may be performed, with the DRC curve(s) being configured to render the image to match the rendering luminance as if the image was captured with the first AE Target, but with less highlight signal clipping than if the image had been captured at the first AE Target (525).

Referring now to FIG. 5B, an EV− adaptive AE scenario is illustrated in both line graph and histogram forms. Line graph 550 represents three distinct lux zones over which the EV bias may vary in an EV− scenario. First, in Zone 1, it is recognized that using a shorter integration time would boost the noise in the image, and thus the EV− bias will be disabled. Next, in Zone 2, the so-called "transition zone," noise behavior gets better as scene illuminance increases, so the EV− bias may be gradually increased. Finally, in Zone 3, EV− bias goes to full strength. The EV− boundary may be set to meet a maximum tolerable noise requirement.

Turning to EV0 histogram 560, exemplary highlight clipping is shown via the large percentage of pixels having the "MAX" luminance level. Next, the EV− histogram 570 is shown, representing the luminance distribution of pixels in the image that has been captured after the AE target has been biased downward. Finally, post-process histogram 580 represents the distribution of pixel luminance values after the pixels have been rendered as if the image was captured at the EV0 exposure level. As shown in histogram 580, the low and middle tones experience little to no change, but the high tones are adjusted such that the pixels at the highest luminance levels are no longer clipped as they were in histogram 560.

Figure 6A:
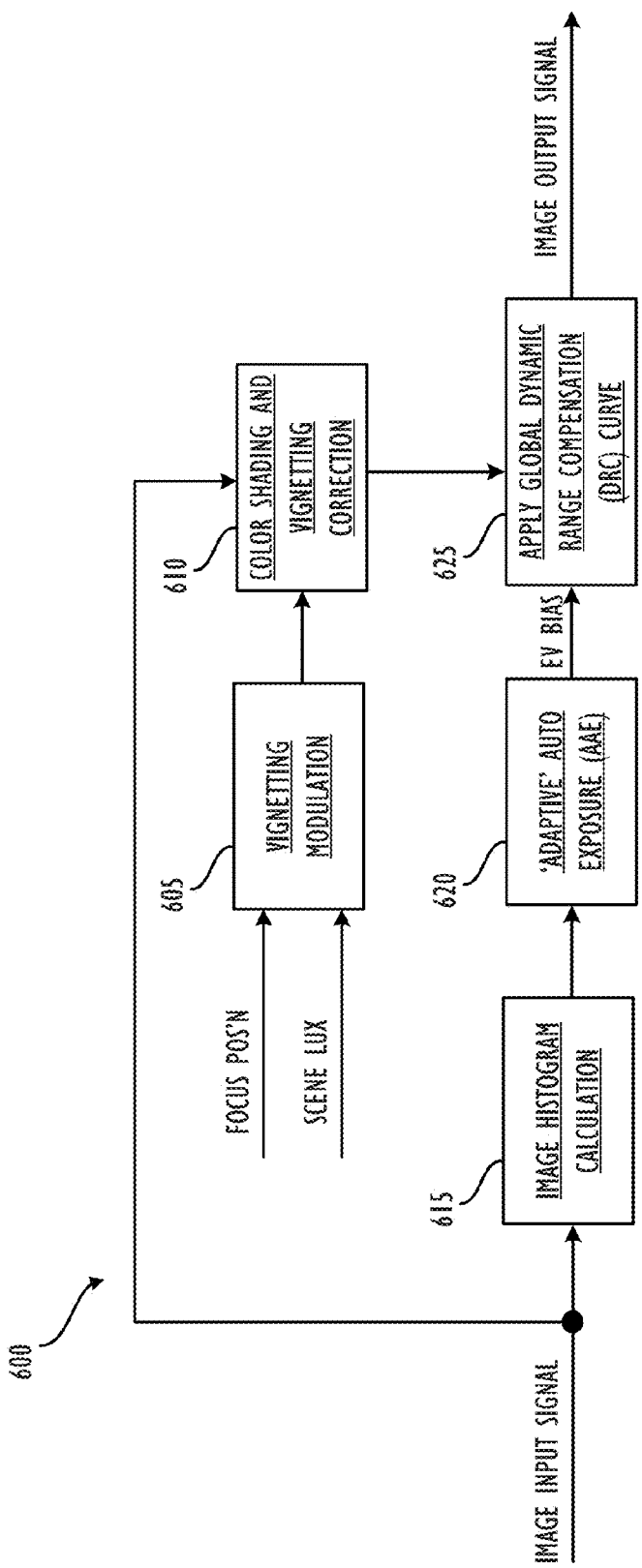
FIG. 6A shows an adaptive AE process with combined color shading and vignetting correction in block diagram form, according to one embodiment.

Referring now to FIG. 6A, an adaptive AE process with combined color shading and vignetting correction is shown in block diagram form 600, according to one embodiment. First, the camera focus position and scene lux level may be sent to vignetting modulation block 605. Once the amount of vignetting modulation has been determined, the color shading and vignetting correction may be applied to the image input signal at block 610. Simultaneously, the image input signal may be sent to an image histogram calculation block 615. Based on an analysis of the image histogram, e.g., an Adaptive AE strategy may be determined at block 620, which will apply an EV bias (either positive or negative) to the image data in conjunction with the color shading and vignetting corrected data via a global DRC curve (625). The resulting tone mapped image is then output as the image output signal.

Figure 6B:
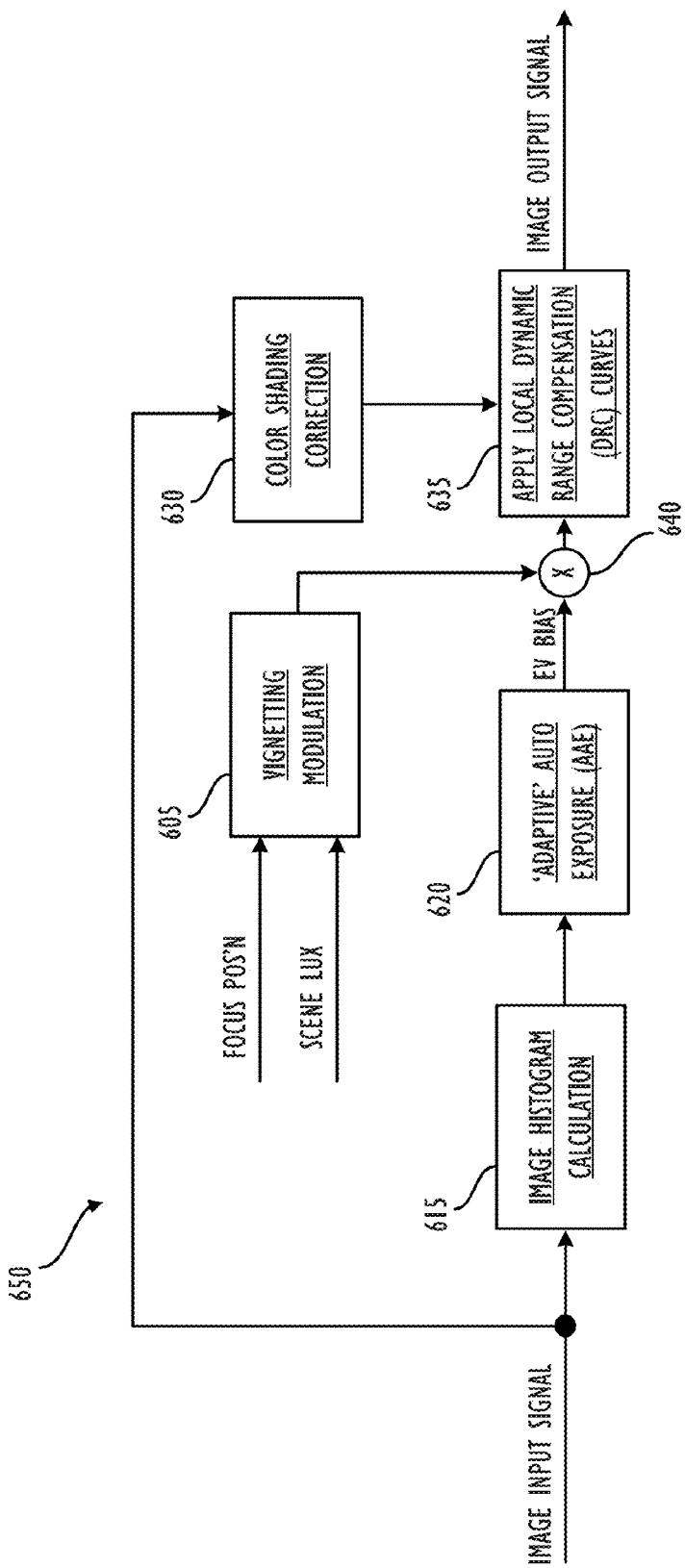
FIG. 6B shows an adaptive AE process with decoupled color shading and vignetting correction in block diagram form, according to one embodiment.

Referring now to FIG. 6B, an adaptive AE process with decoupled color shading and vignetting correction is shown in block diagram form 650, according to one embodiment. First, the camera focus position and scene lux level may be sent to vignetting modulation block 605. Simultaneously, the image input signal may be sent to an image histogram calculation block 615. Based on an analysis of the image histogram, e.g., an Adaptive AE strategy may be determined at block 620, which will apply an EV bias (either positive or negative) to the image data in conjunction with the vignetting correction gains at block 640. Decoupled from the vignetting modulation process, color shading correction may be performed at block 630. The output of the color shading correction and the block 640 may then be tone mapped via the application of a plurality of spatially-varying local DRC curves (635). The resulting tone mapped image is then output as the image output signal.

Lux-Dependent and Focus-Dependent Vignetting Modulation

Figure 7:
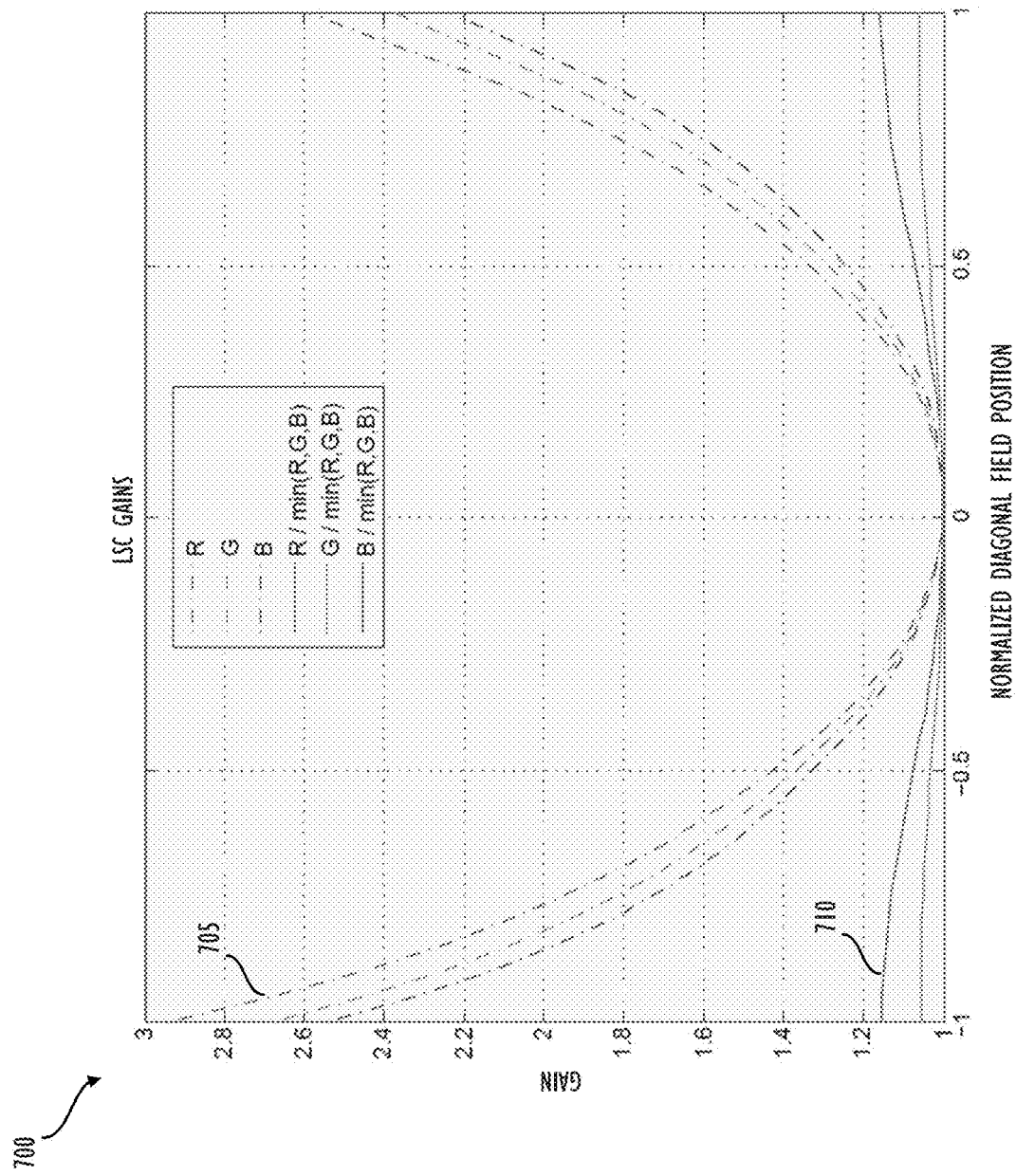
FIG. 7 illustrates LSC gain curves before and after normalization in graph form, according to one embodiment.

In one embodiment described herein, lens shading correction (LSC) may be modulated based on scene lux level and focus distance. FIG. 7 illustrates typical LSC gain curves 705 in graph form 700. Commonly, the LSC gains— once plotted in a 2D plot—exhibit a bowl-shaped characteristic. These gains compensate for both color lens shading (i.e., the deviation between R, G, and B channels) and vignetting. The solid lines 710 represent per-pixel normalized gains, as will be explained in further detail below.

In low-light situations, the image noise might degrade the image quality—especially at off-axis image positions since the shading correction gains, $g_{vig}(x)$, may become large in this image area (compare with the dashed-line curve 705 in FIG. 7). In the extreme case of complete darkness, the sensor output is purely noise. In such a case, the bowl shaped shading gains do nothing but amplify noise. This can lead to unacceptable noise levels in the image. As scene illuminance increases, the sensor captures more signal from the actual scene, and the lens shading effects begin to appear. To deal with the situation, the lens shading gains are configured to adaptively 'scale down' when scene lux approaches zero and 'scale up' when scene lux changes from near zero to become larger. In other words, the lens shading correction behavior may be driven, at least in part, by sensor noise levels. By characterizing scene noise levels, the system may avoid over-boosting noise in the captured images.

Thus, in one embodiment described here, the lens shading gains are modulated. For simplicity, a single function, $g_{vig}(x)$, may be used to represent the complete shading gain, encompassing both color shading gain and vignetting gain. An exemplary adaptation scheme may be expressed using the following formula, wherein $g_{vig}(x)$ is blended linearly with an "identity" gain curve (i.e., gain of 1.0) driven by the AE digital gain or the estimated scene lux:

$$g'_{vig}(x) = (1-z_0)g_{vig}(x) + z_0, \quad \text{(Eqn. 6)}$$

where $z_0$ is the modulation strength that, for instance, is assigned a value ranging from 1.0 to 0.25 at illuminance levels ranging from 50 lux to 0 lux, respectively.

Figure 8B:
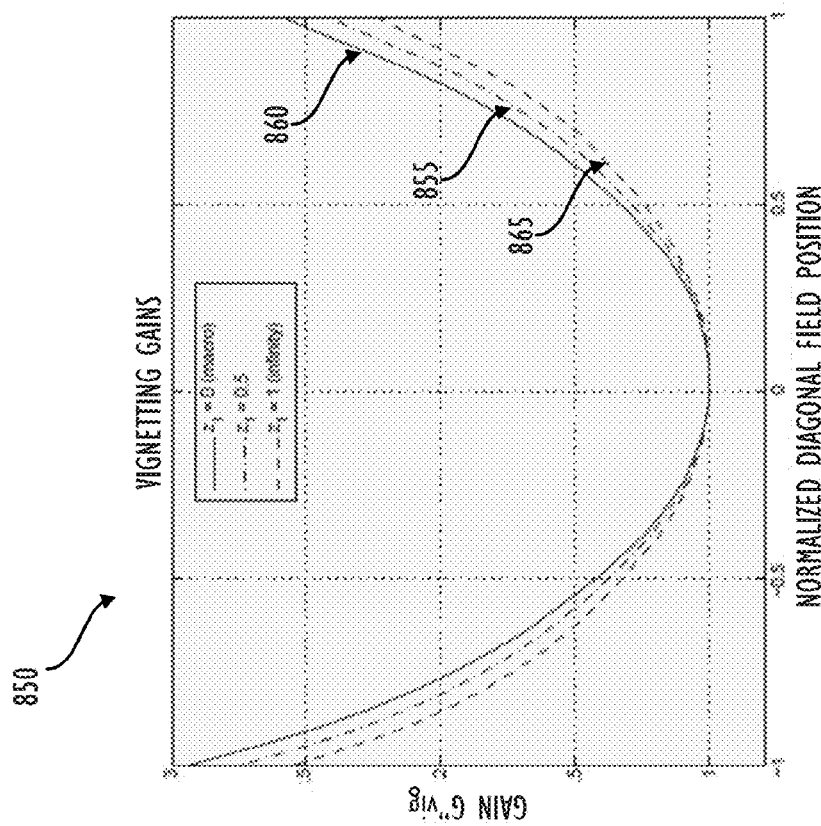
FIG. 8B illustrates focus position-dependent vignetting gain modulation curves in graph form, according to one embodiment.
Figure 8A:
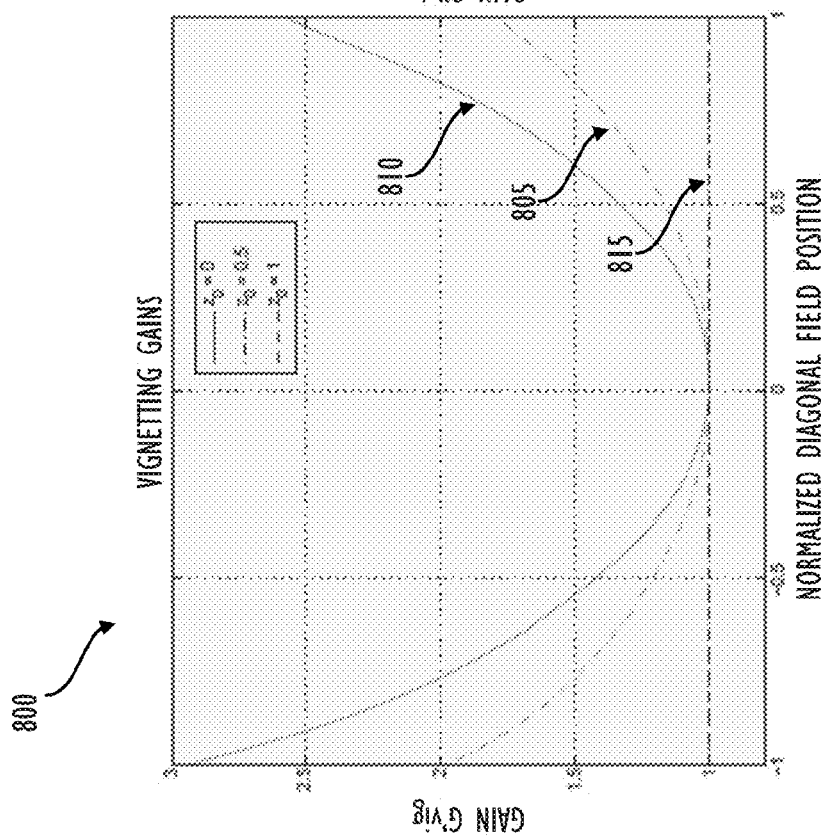
FIG. 8A illustrates low-light vignetting gain modulation curves in graph form, according to one embodiment.

FIG. 8A illustrates an exemplary modulation of shading gains in the case of low light scene conditions, whereas FIG. 8B illustrates an exemplary modulation of shading gains driven by focus position. Curves 805/855 represent the shading gains with a modulation value of 0.5; curves 810/860 represent the shading gains with a modulation value of 0 (i.e., macro lens setting in the case of FIG. 8B); and curves 815/865 represent the shading gains with a modulation value of 1.0 (i.e., infinity focus in the case of FIG. 8B).

As alluded to above with respect to FIG. 8B, in another embodiment of the lens shading gain modulation, the lens shading gain may be modulated based on the focus distance. For optical systems without zoom, the inventors have discovered that the lens shading fall off changes as focus distance changes. The shorter focus distances have more corner shading fall off as the effective image system field of view increases. Signal landing on "off center" positions of the imaging sensor comes from a wider incoming angle (see, e.g., FIG. 8B, where the horizontal axis represents a normalized diagonal field position from the center of the lens). Because different focus positions may lead to different amounts of lens vignetting, it may be desirable to change $g_{vig}$ based on the lens focus position:

$$g''_{vig}(x) = (1-z_1)g_{vig}^{macro}(x) + z_1 g_{vig}^{inf}(x), \quad \text{(Eqn. 7)}$$

where $0<z_1<1$ is the blending coefficient between a first vignetting correction function $g_{vig}^{macro}(x)$, which is obtained from calibration at macro lens settings and a second vignetting correction function $g_{vig}^{inf}(x)$, which is obtained from calibration at infinity focus. Modulating $z_1$ with the lens focus position may serve to improve the vignetting correction by lowering the risk of over- or under-correction across the focus range. The exact modulation mapping between $z_1$ and the lens position is derived from lens calibration data over a full focus sweep. In other words, the lens shading correction behavior may also be driven, at least in part, by lens focus positions. By characterizing the optical system of the camera, the system may avoid over- or under-correcting for lens shading fall off changes. The scene lux-based modulation and focus position-based modulation may be implemented alone or in conjunction with one another.

As illustrated in FIG. 6B, the total shading gain may be decoupled into color shading gains that are different between the different sensor color channels and a common vignetting gain that is same for all sensor color channels. Color shading gains may be used to compensate for the sensor pixel position-dependent light absorbing discrepancies between different color channels. Vignetting gains may be used to compensate for the incoming light intensity fall off when the incoming light hits the imaging system at wider angle. The lens shading modulation techniques described above may be deployed on total lens shading gain curves of all sensor color channels, or may be deployed on only vignetting gain curves. Alternately, the total shading gain may comprise luminance shading only (i.e., rather than using different color shading gains for each of the different sensor color channels), such that the chroma shading remains untouched.

The lens shading gains may be normalized such that the minimum gain from all color channels is always 1.0 at every pixel location. The gain curves are illustrated as solid lines 705 in FIG. 7, whereas the dashed lines 710 represent the compound lens shading gains with color and vignetting correction characteristics. The normalized lens shading gains correct for the color lens shading portion, whereas the vignetting portion remains uncorrected. Later, the vignetting portion may be corrected using spatially-adaptive DRC curves in a Local Dynamic Range Compensation (LDRC) process. These curves may be calculated according to Eqns. 3 and 4 above, with the exception that the EV gain is replaced by a compound gain, $g_{tot}$, which encompasses both the EV bias gain and the spatially-varying vignetting gains $g_{vig}$, $g'_{vig}$, or $g''_{vig}$, i.e., $g_{tot}=g_{EV}*g_{vig}$, for instance. The linear segment of the function $f_{DRC}(n)$ as used in Eqns. 3 and 4 may then be defined as $$f_{lin}(n) \frac{n}{N} g_{tot}.$$

This decoupling of color shading gains and vignetting gains has several advantages. Firstly, the dynamic range is increased at off-axis pixel locations since the vignetting may cause more highlights to be captured without the signal clipping. At the LDRC stage, the linear "up gaining" with $g_{tot}$ will ensure that the vignetting is corrected for the low- and mid-tones, and the non-linear part of the curve will compress the highlights. Secondly, the color shading is always fully corrected at the LSC stage, whereas the vignetting portion may be only partially corrected according to the lux- and focus-dependent modulation as described earlier. Thirdly, the computation in the vignetting modulation needs only to be calculated for one gain instead of four pixel gains (e.g., R, Gb, Gr, B) in the case that the color lens shading is carried out on a Bayer color filter array raw image prior to RGB interpolation.

In the LDRC process, the Tone Mapping Operator, as described with reference to FIG. 2 above, may be replaced with a spatially-varying, i.e., Local DRC hue-preserving RGB Tone Mapping Curve. First, luminance values may be calculated from the RGBs for each pixel in the image. Next, gains are computed for local DRC tone mapping curves, and the gains for each local DRC tone mapping curve are then applied to the appropriate input RGB values to generate the desired output RGB levels. For example, in some embodiments, a local DRC tone mapping curve may be defined for each pixel location in the image. In other embodiments, local DRC tone mapping curves may be defined for a plurality of locations within the image, and local DRC tone mapping curves for individual pixels may be determined by, e.g., interpolating between a plurality of the closest defined local DRC tone mapping curves.

Figure 9:
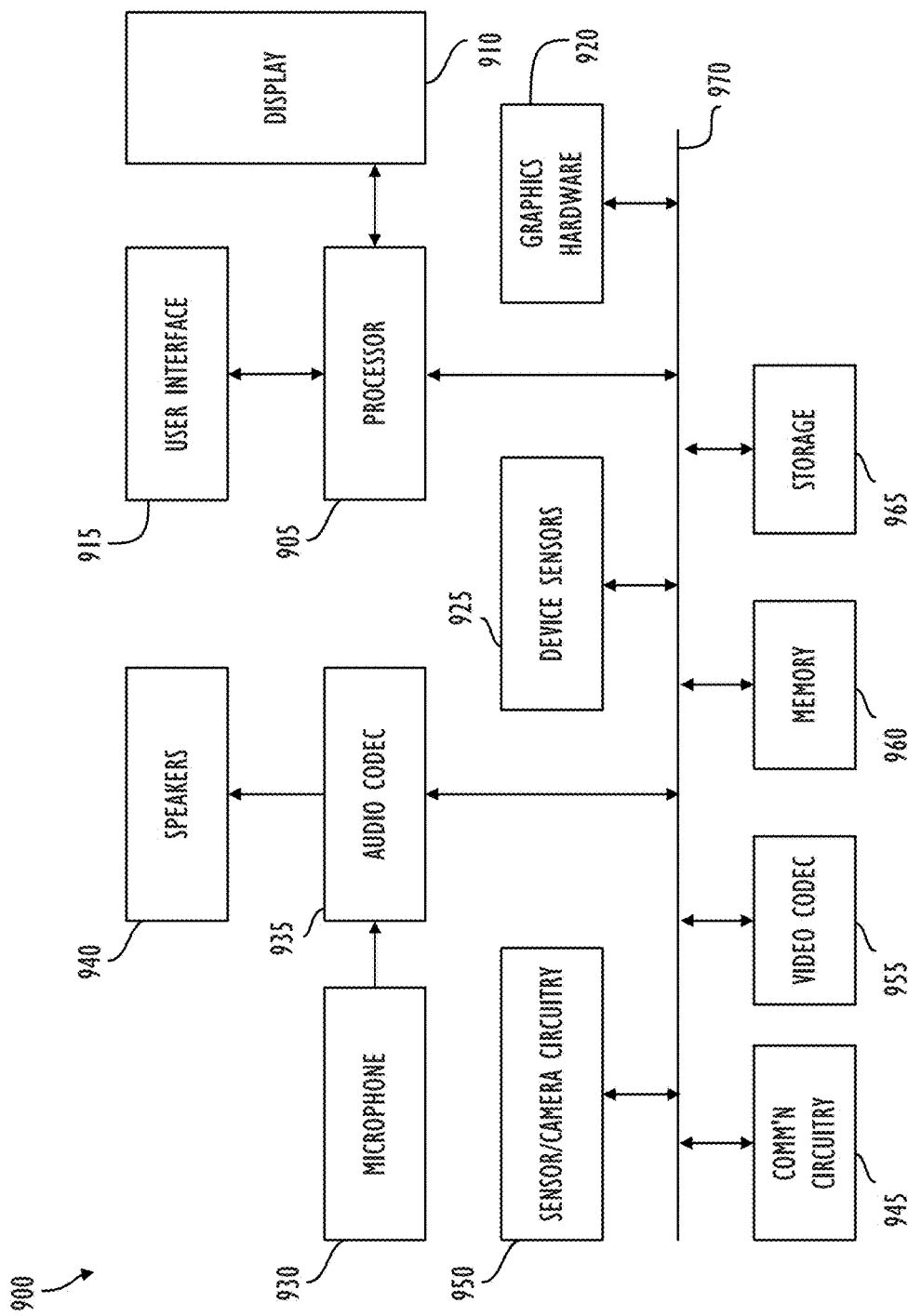
FIG. 9 shows, in block diagram form, an illustrative electronic device that may implement one or more of the described adaptive AE and tone mapping image processing operations.

Referring now to FIG. 9, a simplified functional block diagram of an illustrative electronic device 900 is shown according to one embodiment. Electronic device 900 may include processor 905, display 910, user interface 915, graphics hardware 920, device sensors 925 (e.g., proximity sensor/ambient light sensor, accelerometer and/or gyroscope), microphone 930, audio codec(s) 935, speaker(s) 940, communications circuitry 945, digital image capture unit 950, video codec(s) 955, memory 960, storage 965, and communications bus 970. Electronic device 900 may be, for example, a personal digital assistant (PDA), personal music player, mobile telephone, or a notebook, laptop or tablet computer system.

Processor 905 may be any suitable programmable control device capable of executing instructions necessary to carry out or control the operation of the many functions performed by device 900 (e.g., such as the generation and/or processing of images in accordance with operations in any one or more of the Figures). Processor 905 may, for instance, drive display 910 and receive user input from user interface 915 which can take a variety of forms, such as a button, keypad, dial, a click wheel, keyboard, display screen and/or a touch screen. Processor 905 may be a system-on-chip such as those found in mobile devices and include a dedicated graphics processing unit (GPU). Processor 905 may be based on reduced instruction-set computer (RISC) or complex instruction-set computer (CISC) architectures or any other suitable architecture and may include one or more processing cores. Graphics hardware 920 may be special purpose computational hardware for processing graphics and/or assisting processor 905 process graphics information. In one embodiment, graphics hardware 920 may include a programmable graphics processing unit (GPU).

Sensor and camera circuitry 950 may capture still and video images that may be processed to generate wide angle-of-view images, at least in part, by video codec(s) 955 and/or processor 905 and/or graphics hardware 920, and/or a dedicated image processing unit incorporated within circuitry 950. Images so captured may be stored in memory 960 and/or storage 965. Memory 960 may include one or more different types of media used by processor 905, graphics hardware 920, and image capture circuitry 950 to perform device functions. For example, memory 960 may include memory cache, read-only memory (ROM), and/or random access memory (RAM). Storage 965 may store media (e.g., audio, image and video files), computer program instructions or software, preference information, device profile information, and any other suitable data. Storage 965 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 960 and storage 965 may be used to retain computer program instructions or code organized into one or more modules and written in any desired computer programming language. When executed by, for example, processor 905 such computer program code may implement one or more of the methods described herein.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., some of the disclosed embodiments may be used in combination with each other). In addition, it will be understood that some of the operations identified herein may be performed in different orders. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device, readable by a programmable control device and comprising instructions stored thereon to cause the programmable control device to:
    obtain a first image of a scene, wherein the first image comprises a first plurality of pixels;
    determine a scene illuminance level for the first image;
    determine a lens shading correction curve based, at least in part, on a blended combination of a first curve and a second curve, wherein respective contributions of the first curve and the second curve to the blended combination are based, at least in part, on the determined scene illuminance level; and apply the determined lens shading correction curve to the first image, wherein the determined lens shading correction curve encompasses both color shading gain and vignetting gain.

2. The non-transitory program storage device of claim 1, wherein the first curve comprises a lens shading correction gain curve and the second curve comprises an identity gain curve.

3. The non-transitory program storage device of claim 1, wherein the blended combination comprises a linear blending.

4. The non-transitory program storage device of claim 1, wherein the vignetting gain is applied equally to each color channel of an image sensor used to capture the first image.

5. The non-transitory program storage device of claim 1, wherein the color shading gain is applied differently for each color channel of an image sensor used to capture the first image.

6. The non-transitory program storage device of claim 1, wherein the color shading gain is applied only to a luminance channel of the first image.

7. The non-transitory program storage device of claim 1, wherein the lens shading correction curve is a function of normalized diagonal field position from a center of a lens used to capture the first image.

8. The non-transitory program storage device of claim 1, wherein the instructions to determine a lens shading correction curve further comprise instructions to characterize a noise level of the first image.

9. A system comprising:
an image capture device comprising a lens;
a programmable control device; and
a memory operatively coupled to the image capture device and the programmable control device, the memory having stored therein computer program instructions executable by the programmable control device to:
obtain a first image of a scene, wherein the first image comprises a first plurality of pixels;
determine a scene illuminance level for the first image;
determine a lens shading correction curve based, at least in part, on a blended combination of a first curve and a second curve, wherein respective contributions of the first curve and the second curve to the blended combination are based, at least in part, on the determined scene illuminance level; and apply the determined lens shading correction curve to the first image, wherein the determined lens shading correction curve encompasses both color shading gain and vignetting gain.

10. The system of claim 9, wherein the first curve comprises a lens shading correction gain curve and the second curve comprises an identity gain curve.

11. The system of claim 9, wherein the blended combination comprises a linear blending.

12. The system of claim 9, wherein the vignetting gain is applied equally to each color channel of an image sensor used to capture the first image.

13. The system of claim 9, wherein the color shading gain is applied differently for each color channel of an image sensor used to capture the first image.

14. The system of claim 9, wherein the color shading gain is applied only to a luminance channel of the first image.

15. The system of claim 9, wherein the lens shading correction curve is a function of normalized diagonal field position from a center of a lens used to capture the first image.

16. The system of claim 9, wherein the instructions to determine a lens shading correction curve further comprise instructions to characterize a noise level of the first image.

17. A method comprising:
obtaining a first image of a scene, wherein the first image comprises a first plurality of pixels;
determining a scene illuminance level for the first image;
determining a lens shading correction curve based, at least in part, on a blended combination of a first curve and a second curve, wherein respective contributions of the first curve and the second curve to the blended combination are based, at least in part, on the determined scene illuminance level; and
applying the determined lens shading correction curve to the first image,
wherein the determined lens shading correction curve encompasses both color shading gain and vignetting gain.

18. The method of claim 17, wherein the first curve comprises a lens shading correction gain curve and the second curve comprises an identity gain curve.

19. The method of claim 17, wherein the blended combination comprises a linear blending.

20. The method of claim 17, wherein the vignetting gain is applied equally to each color channel of an image sensor used to capture the first image.

* * * * *